United States Patent Office 2,694,627
Patented Nov. 16, 1954

2,694,627

RIVET STEEL

Samuel Epstein and Karl F. Haupt, Bethlehem, Pa., assignors to Bethlehem Steel Company, a corporation of Pennsylvania No Drawing. Application April 18, 1951, Serial No. 221,720

5 Claims. (Cl. 75—124)

Our invention relates broadly to alloy steels and more particularly to alloy steels adapted for use as rivets.

An object of our invention is to provide a rivet steel having excellent physical properties, such as high tensile strength, high yield point and good ductility, as well as good clamping power.

Another object of the invention is to provide a rivet steel in which the desired strength is obtained by the inclusion of alloying elements which strengthen the ferrite but which have a minimum effect in increasing hardenability.

Another object of the invention is to provide a rivet steel in which the strength is obtained by the inclusion of elements which do not form carbides.

Still another object of the invention is to provide a rivet steel in which the strength imparting elements have a minimum effect in increasing hardenability and a minimum effect in lowering the $M_s$ temperature.

In riveted joints in structural steel high strength steel rivets have long been used instead of plain carbon steel rivets in order to utilize fewer rivets. With fewer rivets the space occupied by the rivet pattern can be smaller. Therefore, this also enables the use of less structural steel because the gusset plates, for example, can then be made smaller.

However, the commonly used high strength steel rivets have been found to have a tendency to loosen, or if not actually to loosen, at least to show a considerably lower clamping power than plain carbon steel rivets. Such low clamping power seriously lowers the fatigue resistance of the riveted joint.

The rivet hole in a structural member acts as a notch or stress-raiser. Under load, slip of the riveted members will occur because of an insufficiently tight rivet, and the members will then bear against the rivet. The stress in the members near the surface of the hole then rises to a much higher value than the uniform stress across the cross-section of the members. The higher stress near the surface of the hole may be well beyond the endurance limit in fatigue or repeated loading and ultimately causes fatigue failure.

On the other hand, when the rivet is quite tight, no slipping or bearing against the rivet will occur. The stress then tends to pass around the rivet hole in such a way that the stress distribution is not essentially different from what it would be if there were no rivet hole. In this case, the fatigue resistance of the joint is much higher. This explains why high clamping power must be obtained to get good fatigue properties.

In such structures as railway bridges it is especially important to get high fatigue resistance. Yet while the common high strength steel rivets with their higher shear strength have been relatively satisfactory from the standpoint of static loading they have not been acceptable from the standpoint of fatigue or repeated loading because of their low clamping power.

It has been found that the lack of tightness or clamping power of the high strength steel rivets is caused by the slight expansion which accompanies the occurrence of the martensitic or hardened constituent which forms mainly under the two heads of the rivet at the juncture of the heads with the rivet shank—when in the process of driving the hot rivet, the rivet becomes chilled by the structural members which it joins.

This slight expansion accompanying the hardening under the heads of the rivet seems to interfere with the uniform seating of the rivet heads and makes for loosening and poorer clamping power. Shorter rivets of say 2" grip tend to give much poorer clamping power than longer rivets of say 4" grip. This is evidently because with the shorter rivets the chilled regions near the junctures of the two heads of the rivet with the shank constitute a greater portion of the length of the whole rivet than the similar chilled regions in a longer rivet.

A high strength rivet must necessarily contain some strengthening elements. To obtain the desired strength and at the same time avoid the formation of two much of the martensitic or hardening constituent upon cooling of the rivet from above the critical temperature, and thus to obtain high clamping power, has been a problem unsolved until the development of the steel of this invention. In order to solve this problem, we have embodied in our novel steel the following:

(a) Alloying elements which strengthen the ferrite and yet give a minimum total hardenability, in combination with carbon present.

(b) Alloying elements which do not form carbides. Such carbides generally dissolve at the high temperatures to which rivets are heated before driving, and appreciably increase the hardenability of the rivet upon cooling, over that which would be the case if such steel were heated to only slightly above the critical temperature as is ordinarily done in testing for hardenability.

(c) Alloying elements which give a high temperature of martensite formation—the so-called $M_s$ temperature. This is advantageous because if some hard martensitic constituent does form (and indeed the complete avoidance of such a constituent may not be attainable in high strength steel as commercially produced), the higher the $M_s$ temperature the less would be the accompanying dilatation and also the less detrimental a given amount of dilatation would be.

(d) Alloying elements imparting a high degree of toughness to the driven rivets. These elements have the additional advantage of low cost, and do not interfere with the ease of driving the hot rivets.

Accordingly, our novel rivet steel, which has high strength and superior clamping power, comprises, essentially, the following range of compositions:

| | Per cent |
|---|---|
| Carbon | 0.05 to 0.12 |
| Manganese | 0.2 to 0.6 |
| Nickel | 0.7 to 1.7 |
| Copper | 0.6 to 1.2 |
| Silicon | 0.6 to 1.2 |
| Aluminum | 0.1 to 0.5 |

In the above compositions the lowest feasible contents of carbon and manganese are used; these are maintained on the low side in order to avoid hardening.

The nickel, copper, silicon, and aluminum contents in the above ranges are used to obtain the required strength mainly by means of their effects in strengthening the ferrite of this steel. These elements are the mildest ones of those available insofar as increasing the hardenability is concerned in combination with the carbon present.

The elements such as chromium and molybdenum which like manganese have a much stronger effect in increasing the hardenability have been omitted. These are also carbide forming elements. After heating the steel to the temperatures used in heating hot-driven rivets (approximately 2200° F.) the carbides of these elements are generally dissolved. In this dissolved form these elements would exert their maximum effect in increasing the hardenability.

With respect to the $M_s$ temperature of martensite formation, nickel and copper in the above amounts have a relatively small effect in lowering the $M_s$ temperature—in general considerably smaller than that of the carbide forming elements. Silicon has no effect in lowering the $M_s$ temperature. Aluminum is outstanding among the elements in its strong tendency to raise the $M_s$ temperature.

There follows a typical composition within the range shown above. This gives the clamping power indicated for ¾" diameter rivets with a grip length of 2" driven at 2150° F. These data may be compared with the data for similar plain carbon steel rivets similarly driven.

|  | Steel Composition, Percent |  |  |  |  |  | Clamping Power, lbs./sq. in. |
|---|---|---|---|---|---|---|---|
|  | C | Mn | Ni | Cu | Si | Al |  |
| This Invention | .06 | .47 | 1.3 | .7 | .93 | .10 | 25,600 |
| Plain Carbon | .14 | .44 | .05 | .18 | .01 |  | 20,700 |

The clamping power is determined by machining away the flange part of the head of the rivet and measuring the amount by which the rivet then decreases in length. From this the clamping power in lbs./sq. in. is calculated.

It is seen that the clamping power of the rivets of the high strength steel of this invention is higher than that of the plain carbon steel. Ordinary commercial high strength steel on the other hand frequently gives loose rivets or rivets with very poor clamping power of 10,000 lbs./sq. in. and lower.

The data for the clamping powers given above are for rivets with a 2" length of grip. For similar ¾" diameter rivets but with a 4" length of grip the clamping power for the plain carbon steel was 35,000 lbs./sq. in. whereas for the typical steel of this invention the clamping power was 48,000 lbs./sq. in. The data available indicate clearly that such a marked increase in clamping power is accompanied by a material increase in fatigue resistance.

The rivet steel of this invention had high yield and tensile strength conforming to the authoritative specifications for high strength rivet steel. The yield strength in the as annealed condition in the ¾" diameter typical rivet steel of this invention shown above, was 58,000 lbs./sq. in. The tensile strength in the as annealed condition of this same steel was 75,000 lbs./sq. in. This steel is also very tough and has low notch sensitivity. After driving ¾" rivets of this typical steel of this invention Charpy keyhole impact specimens were machined from the driven rivets and impact tests were made at a series of lowered temperatures. In these tests the "transition temperature" where the behavior changed from ductile to brittle as the testing temperature was lowered was −90° F. This denotes great toughness.

Rivets of the typical composition of this invention have been driven under commercial fabricating conditions in comparison with carbon steel rivets. The riveters have reported that the rivets of this invention are just as easy to handle as carbon steel rivets. The rivet holes filled out as well as with carbon steel rivets and the driving time has been no longer than for carbon steel rivets.

Although we have described our invention hereinabove in considerable detail, we do not wish to be limited to the exact and specific details thereof as shown and described, but we may use such modifications, substitutions, or equivalents thereof as are embraced within the scope of our invention or as are pointed out in the appended claims.

We claim:
1. An alloy steel comprising carbon .12% maximum, manganese .20% to .60%, nickel .70% to 1.70%, copper .60% to 1.20%, silicon .60% to 1.20%, aluminum .10% to .50%, and the balance consisting essentially of iron.

2. A rivet composed of an alloy steel containing carbon .12% maximum, manganese .20% to .60%, nickel .70% to 1.70%, copper .60% to 1.20%, silicon .60% to 1.20%, aluminum .10% to .50%, and the balance consisting essentially of iron.

3. An alloy steel characterized essentially by a ferritic structure having a strength substantially in excess of that found in commercial carbon steels, said alloy steel comprising carbon .12% maximum, manganese .20% to .60%, nickel .70% to 1.70%, copper .60% to 1.20%, silicon .60% to 1.20%, aluminum .10% to .50%, and the balance consisting essentially of iron.

4. A rivet composed of an alloy steel and characterized essentially by a ferritic structure having a strength substantially in excess of that found in commercial carbon steels, said alloy steel comprising carbon .12% maximum, manganese .20% to .60%, nickel .70% to 1.70%, copper .60% to 1.20%, silicon .60% to 1.20%, aluminum .10% to .50%, and the balance consisting essentially of iron.

5. A rivet composed of an alloy steel and characterized by hardenability substantially lower than that found in commercial high strength steel rivets, said alloy steel comprising carbon .12% maximum, manganese .20% to .60%, nickel .70% to 1.70%, copper .60% to 1.20%, silicon .60% to 1.20%, aluminum .10% to .50%, and the balance consisting essentially of iron.

References Cited in the file of this patent

UNITED STATES PATENTS

| Number | Name | Date |
|---|---|---|
| 2,182,135 | Reinhardt | Dec. 5, 1939 |
| 2,200,872 | Brophy et al. | May 14, 1940 |
| 2,621,278 | Muller | Dec. 9, 1952 |

OTHER REFERENCES

Journal of the Iron and Steel Institute, No. 1, 1941, pages 74A and 75A.